(12) United States Patent
Lucas

(10) Patent No.: US 11,965,529 B2
(45) Date of Patent: Apr. 23, 2024

(54) LINEAR FAN FORCED AIR COOLING

(71) Applicant: Perpetua, Inc., Liberty Lake, WA (US)

(72) Inventor: Timothy S. Lucas, Liberty Lake, WA (US)

(73) Assignee: Neofan, Inc., Richmond, VA (US)

(*) Notice: Subject to any disclaimer, the term of this patent is extended or adjusted under 35 U.S.C. 154(b) by 50 days.

(21) Appl. No.: 17/909,299

(22) PCT Filed: Mar. 4, 2021

(86) PCT No.: PCT/US2021/020936
§ 371 (c)(1),
(2) Date: Sep. 2, 2022

(87) PCT Pub. No.: WO2021/178711
PCT Pub. Date: Sep. 10, 2021

(65) Prior Publication Data
US 2023/0049263 A1 Feb. 16, 2023

Related U.S. Application Data

(60) Provisional application No. 63/001,071, filed on Mar. 27, 2020, provisional application No. 62/985,121, filed on Mar. 4, 2020.

(51) Int. Cl.
*F04D 33/00* (2006.01)
*F04D 25/06* (2006.01)
(Continued)

(52) U.S. Cl.
CPC .......... *F04D 33/00* (2013.01); *F04D 25/0606* (2013.01); *F04D 25/08* (2013.01);
(Continued)

(58) Field of Classification Search
CPC ...... F04D 33/00; F04D 25/0606; F04D 25/08; F05D 2260/52; H02K 1/141; H02K 1/34; H02K 7/14; H02K 33/16
(Continued)

(56) References Cited

U.S. PATENT DOCUMENTS 4,063,826 A 12/1977 Riepe
4,595,338 A * 6/1986 Kolm .................... F04D 23/006
310/330

(Continued)

FOREIGN PATENT DOCUMENTS

JP 2005-133555 A 5/2005

OTHER PUBLICATIONS

International Search Report dated Jun. 25, 2021 issued by the International Bureau of WIPO in related International PCT Patent Application No. PCT/US2021/020936; filed Mar. 4, 2021.

*Primary Examiner* — Brian Christopher Delrue
(74) *Attorney, Agent, or Firm* — Gordon Rees Scully & Mansukhani, LLP

(57) ABSTRACT

A linear fan including a fan blade attached a fan frame by a wire spring having a first end attached to the fan blade and a second end attached to the fan frame. The fan blade includes a free end such that the blade oscillates by pivoting on the wire spring. The the wire spring flexes to enable the fan blade to oscillate. The fan includes a motor for driving the oscillation of the fan blade. The motor includes an armature or permanent magnet connected to the fan blade and a stator assembly connected to the fan frame. The stator assembly includes a current carrying coil wrapped around a leg of a stator core. The motor is controlled to vary the direction of the current being carried in the coil to thereby change the direction of the magnetic field created by the stator assembly and cause the fan blade to oscillate.

18 Claims, 17 Drawing Sheets

(51) Int. Cl.
    *F04D 25/08*     (2006.01)
    *H02K 1/14*     (2006.01)
    *H02K 1/34*     (2006.01)
    *H02K 7/14*     (2006.01)
    *H02K 33/16*     (2006.01)

(52) U.S. Cl.
    CPC ............... *H02K 1/141* (2013.01); *H02K 1/34* (2013.01); *H02K 7/14* (2013.01); *H02K 33/16* (2013.01); *F05D 2260/52* (2013.01)

(58) Field of Classification Search
    USPC ...................................... 310/216.021–216.23
    See application file for complete search history.

(56) References Cited

U.S. PATENT DOCUMENTS

| | | | | |
|---|---|---|---|---|
| 4,780,062 | A * | 10/1988 | Yamada | F04D 33/00 |
| | | | | 417/410.2 |
| 5,015,903 | A * | 5/1991 | Hancock | H02K 29/06 |
| | | | | 310/168 |
| 6,246,561 | B1 * | 6/2001 | Flynn | H02K 33/12 |
| | | | | 361/147 |
| 2013/0183154 | A1 | 7/2013 | Lucas | |
| 2014/0166260 | A1 | 6/2014 | Roebke | |
| 2016/0066477 | A1 * | 3/2016 | Liu | G06F 1/1656 |
| | | | | 29/890.035 |
| 2017/0254336 | A1 * | 9/2017 | Nguyen | F04D 33/00 |
| 2019/0301442 | A1 * | 10/2019 | Hao | H05K 7/20154 |
| 2020/0025217 | A1 * | 1/2020 | Lucas | H02K 33/06 |
| 2020/0284249 | A1 * | 9/2020 | Nguyen | F04B 45/047 |
| 2023/0049263 | A1 * | 2/2023 | Lucas | H02K 33/16 |
| 2023/0349396 | A1 * | 11/2023 | Lucas | H02K 7/14 |

\* cited by examiner

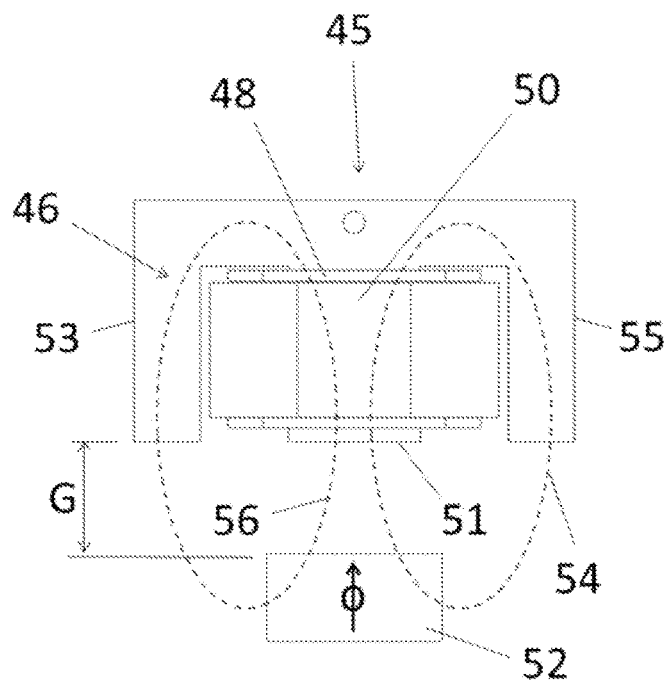
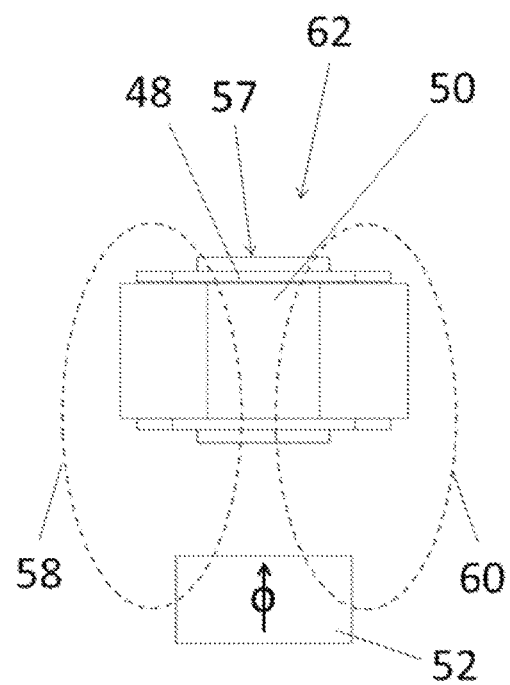
FIGURE 13        FIGURE 14
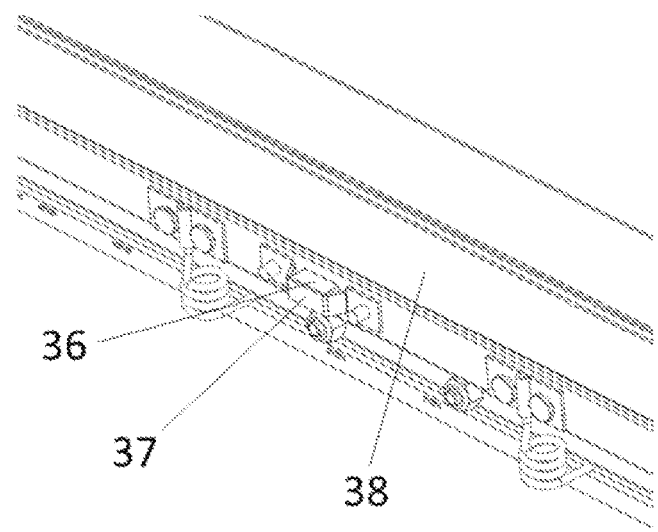
FIGURE 15

LINEAR FAN FORCED AIR COOLING

CROSS REFERENCE TO RELATED APPLICATIONS

This application claims priority to and the benefit of U.S. Provisional Patent Application No. 63/001,071 filed Mar. 27, 2020 and U.S. Provisional Patent Application No. 62/985,121 filed Mar. 4, 2020. The foregoing provisional applications are both incorporated by reference herein in their entireties.

BACKGROUND

This application relates to fan technology for use in forced-air thermal management systems and in particular for forced air thermal management systems in hot harsh environments and for general-purpose fan applications.

Fan-driven forced-air heat transfer systems are the most prevalent thermal management solution for electronics cooling. Recently, markets such as automotive, telecom and LED lighting applications are pushing electronics products into increasingly hot and harsh environments, which can significantly degrade fan life since bearing lubricants evaporate exponentially faster as operating temperatures increase. In harsh environments, bearings can also aspirate atmospheric contaminants causing degradation of lubricants, thereby further reducing fan life.

Since linear fans (aka cantilever fans) move air via an oscillating blade which pivots on a spring, they do not require bearings and thus their life expectancy is not affected by temperature or degradation of lubricants. So called "infinite life" can be achieved for linear fans using pivot springs made of ferrous metals if the spring's peak bending stress is less than the material's fatigue limit. However, steel sheet metal pivot springs have proven problematic and as such have not seen commercial success.

A typical prior art linear fan architecture is illustrated in FIG. 1, comprising spring clamp blocks 2, sheet metal spring 4 and rigid fan blade 6. Blade 6 oscillates back and forth by pivoting on sheet metal spring 4 which bends to accommodate the blade oscillation. This architecture consisting of a rigid blade pivoting on a bending spring is essential for the dynamic stability needed for commercially viable linear fans.

To create air flow, the blade must oscillate in its fundamental pivot mode in the ±x direction, as indicated by the curved arrow in FIG. 1. If the blade assembly is excited in higher oscillation modes, then those higher mode oscillations are superimposed on the fundamental oscillation causing dynamic instabilities of the blade, premature spring failure due to high spring stresses and excessive noise.

For the architecture shown in FIG. 1, the larger the ratio of blade height $H_B$ to spring height $H_S$ then the greater the dynamic stability of the blade assembly. The larger the $H_B/H_S$ ratio, the more the blade behaves dynamically like a simple panel on a hinge. Compared to a full cantilever blade that is free to bend along its entire height, the FIG. 1 architecture with high $H_B/H_S$ ratios will greatly reduce the number of unwanted higher resonant modes that lead to dynamic instabilities and will also increase the frequency separation between those higher modes and fundamental pivot mode. These advantages will be recognized as long as the spring does not introduce its own instabilities to the blade assembly.

While in theory the blade assembly architecture of FIG. 1 appears to provide high stability, the use of sheet metal pivot springs introduces such instabilities that the blade assembly is not commercially viable. The different materials required for each component will have different coefficient of thermal expansion (CTE) values. Consequently, as temperatures change during operation, the CTE mismatches will cause the sheet metal spring to distort resulting in (1) cyclic changes in spring stiffness, (2) consequent dynamic instabilities, (3) stress risers that exceed the spring's fatigue limit making commercially relevant fan life unachievable and (4) commercially unacceptable noise levels resulting from cyclic snap-throughs in the sheet metal spring. Referring to FIG. 1, these CTE mismatches are problematic at any blade width W, but the CTE induced component distortions obviously become proportionately more severe as blade width W increases.

A further disadvantage of the inclusion of the sheet metal springs in the architecture of FIG. 1, is that linear fans must run at or near their mass-spring resonant frequency in order to operate with acceptable energy efficiency and large spring K (stiffness) values are required to provide resonant frequencies high enough for useful air flow rates. Within the short heights $H_S$ required for dynamic blade stability, sheet metal springs cannot provide spring K values large enough for commercially relevant flow rates without exceeding the fatigue limit of the springs, resulting in rapid fan failure.

If all the linear fan components were made of the same material then the CTE mismatches would be eliminated. However, since the springs must be made of steel to achieve long life then all the other components would also have to be made of steel. But an all steel blade assembly is not commercially viable since linear fans must run at their mechanical resonance frequency and the large mass of an all steel blade would result in resonant frequencies that are too low to achieve commercially useful air flow rates.

Consequently, for linear fans of any width W to achieve commercial viability, a pivot spring is needed that can absorb the different dimensional changes of the blade assembly components due to CTE mismatches and provide the large spring K values needed for commercially useful air flow rates without disrupting the inherent dynamic stability of the FIG. 1 architecture.

To satisfy the current unmet market need for extended fan life in hot harsh environments, the present invention is directed to a fan that includes coil springs to overcome the aforementioned limitations of the prior art.

BRIEF DESCRIPTION OF THE FIGURES

The features, aspects, and advantages of the present disclosure will become apparent from the following description, and the accompanying exemplary embodiments shown in the drawings, which are briefly described below.

FIG. 13 is a simplified top view of an exemplary embodiment of a motor architecture for use in a linear fan.

FIG. 14 is a simplified top view of an exemplary embodiment of a motor architecture for use in a linear fan.

FIG. 15 a partial perspective view of a linear fan assembly showing a permanent magnet mounted on a fan blade.

DETAILED DESCRIPTION

The embodiments described herein relate to a linear fan that may include a linear blade assembly that includes a linear fan blade and a spring. As described further below, the linear fan blade may be driven by an electromagnetic motor, for example. The invention is not limited to various embodiments shown herein. The embodiments are presented merely as examples of the various features of the invention.

Figure 2:
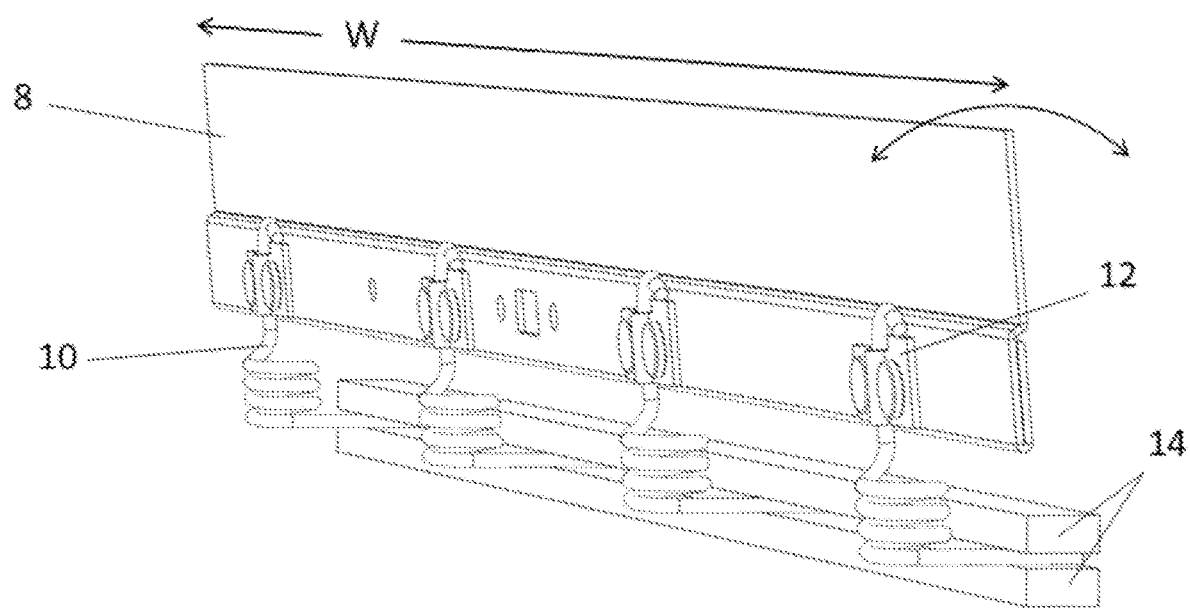
FIG. 2 is a perspective view of an exemplary embodiment of a fan blade assembly including wire springs.
Figure 3:
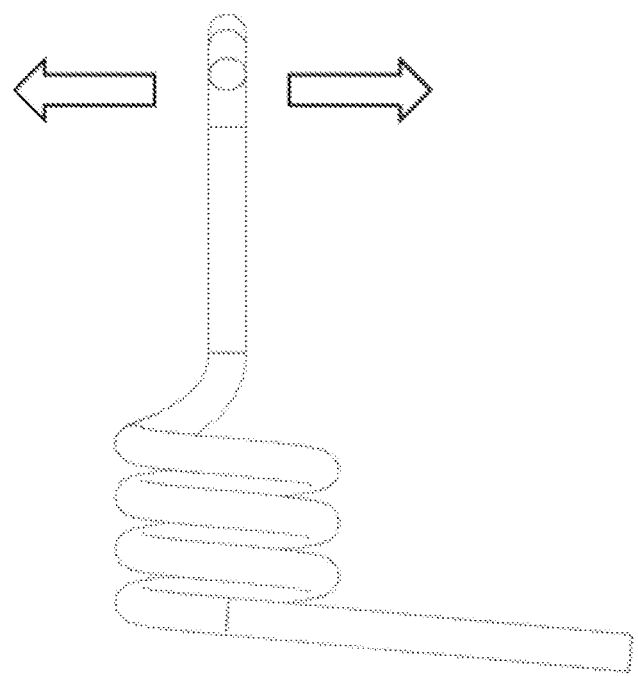
FIG. 3 is a side view of a coil spring employed in the assembly of FIG. 2.

FIG. 2 illustrates an exemplary embodiment of a linear fan blade assembly including a plurality of coil springs 10 having a vertical orientation are rigidly attached to the fan blade 8 by brackets 12 with the other end of springs 10 being attached to stationary clamp blocks 14. Although four springs are illustrated, other embodiments may include one or more coil springs depending on the dimensions of the fan and the application in which the fan is being employed. Springs 10 allow blade 8 to pivot and oscillate as indicated by the curved arrow. Springs 10 have a pitch like compression springs, but unlike compression springs, springs 10 bend in a lateral mode as shown in FIG. 3. The spring 10 is configured with a pitch large enough to prevent contact between the coil turns during lateral bending, which would create instabilities, stress risers, surface damage, premature spring failure and significant noise.

Figure 4:
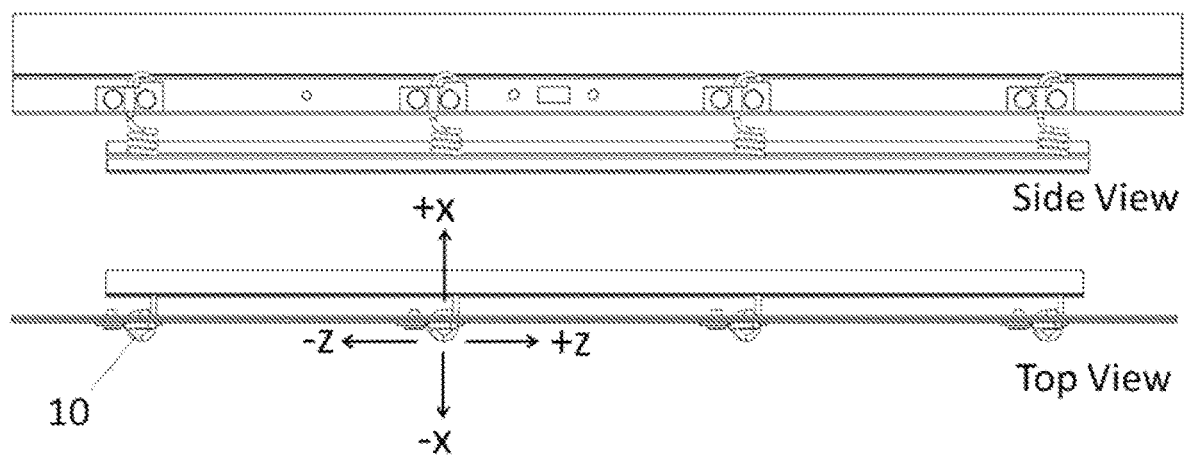
FIG. 4 shows a side view and a top view of the fan blade assembly of FIG. 2.

The blade assembly of FIG. 2 solves the CTE mismatch problem since the vertically mounted coil springs 10 are able to flex in the lateral x-z plane, as shown in FIG. 4, so as to absorb the varying dimensional expansions or contractions of the blade assembly's subcomponents, thereby preventing any distortion or warping of these components due to their different CTE values. The x-z flexing of the springs does not interfere in any way with their functioning as the blade's pivot springs, thus allowing the fan to operate stably over any commercial operating temperature range despite potentially large CTE variations among the blade assembly components.

Figure 5:
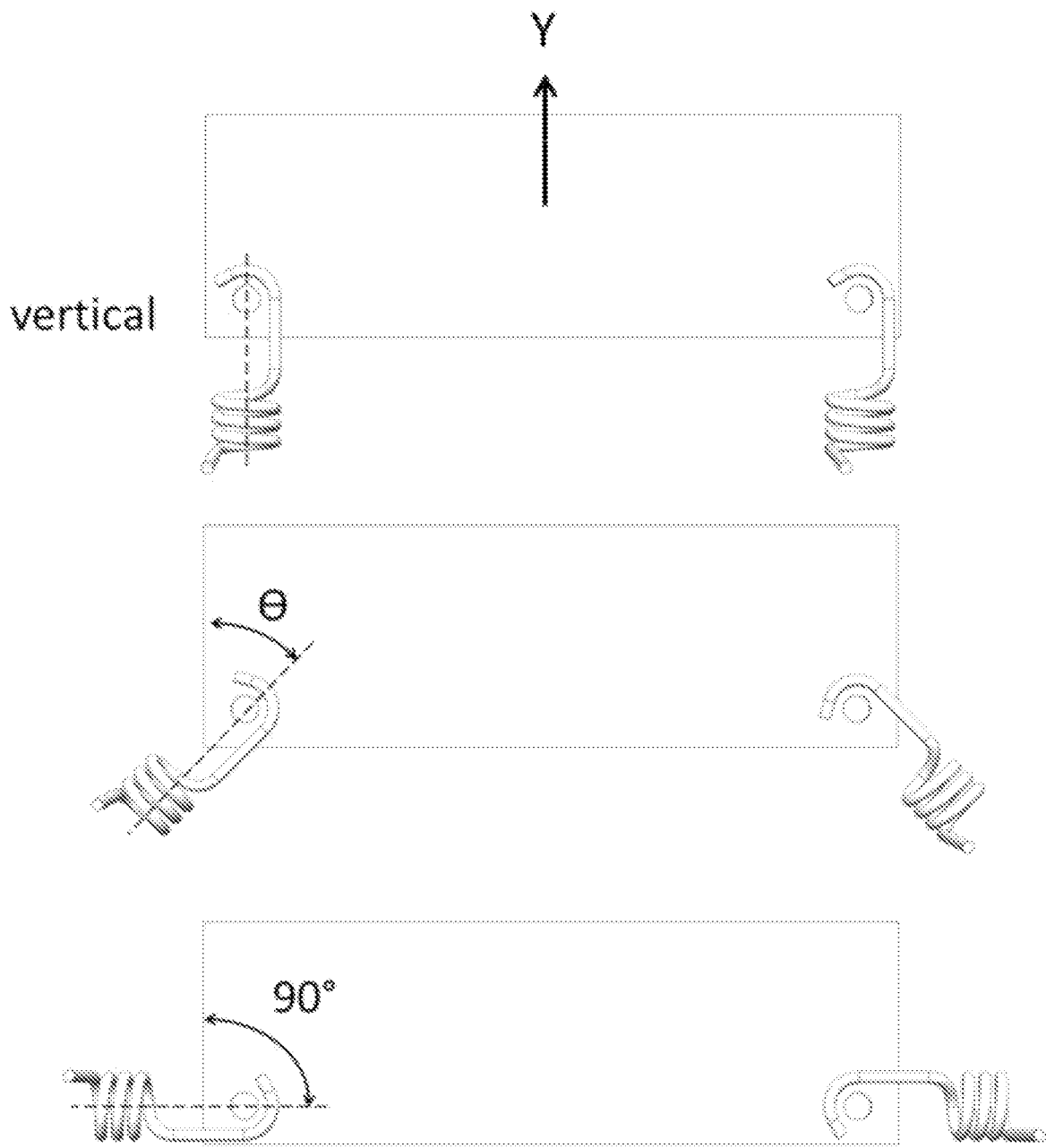
FIG. 5 shows side views of various exemplary embodiments of fan blade assemblies that include wire springs mounted at various orientations relative to a fan blade.

As illustrated in FIG. 5, since the coil springs can flex in any direction, the springs can manage component CTE mismatches regardless of spring mounting angles ranging from 0° (vertical) in the lateral bending mode to 90° (horizontal) in the torsional bending mode or intermediate angles Θ wherein spring deflections will comprise varying ratios of lateral and torsional bending as a function of intermediate angle Θ. Thus, the fan blade assembly described herein includes embodiments with springs mounted at various orientations relative to the fan blade as shown in FIG. 5, for example.

Another significant advantage of the disclosed fan blade assembly is that coil springs can provide much higher spring stiffness K for a given peak bending stress. These higher K values and lower bending stresses enable much higher operating resonant frequencies and blade displacements and therefor much higher air flow rates and pressures. For example, the blade assemblies of FIGS. 6 and 7 were modeled with Finite Element Analysis (FEA) to compare the spring properties for the same blade 18 and same operating condition in both cases. The blade assembly of FIG. 6 comprises a 0.040 in thick and 19 in wide aluminum blade 18, four steel springs 10 having one end rigidly connected to blade 18 and the other end rigidly clamped between stationary clamp blocks 16. The blade assembly of FIG. 7 comprises a 0.004 in thick steel sheet metal spring having one end rigidly bonded to blade 18 and the other end rigidly clamped between stationary clamp blocks 22, where blade 18 is identical to the blade of FIG. 6. In operation the blades 18 of FIGS. 6 and 7 oscillate as indicated by the curved arrows by pivoting on their respective springs.

Figure 6:
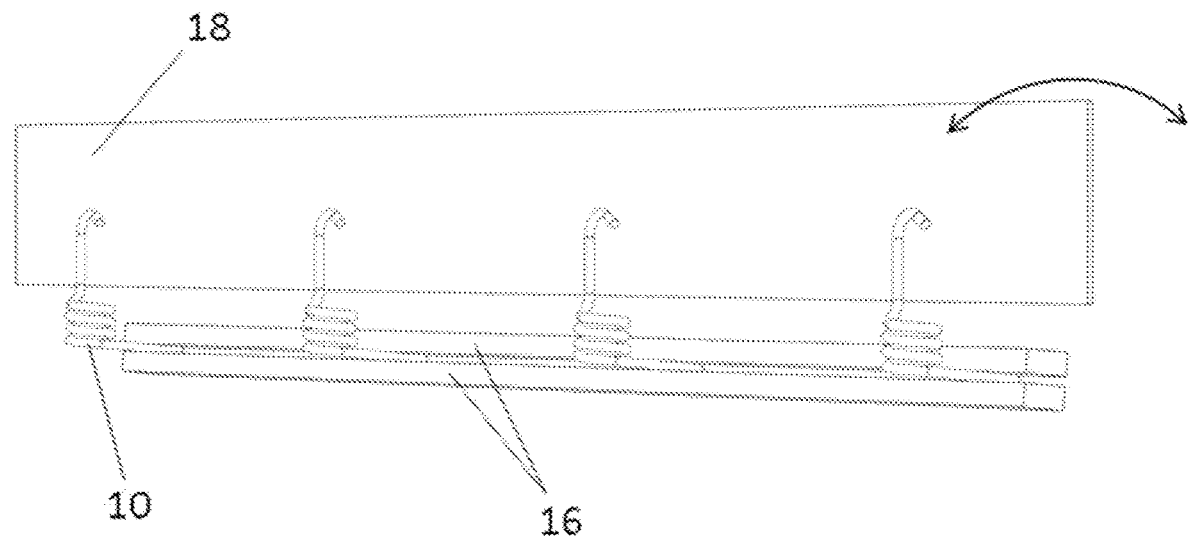
FIG. 6 is a perspective view of a fan blade assembly including wire springs.
Figure 7:
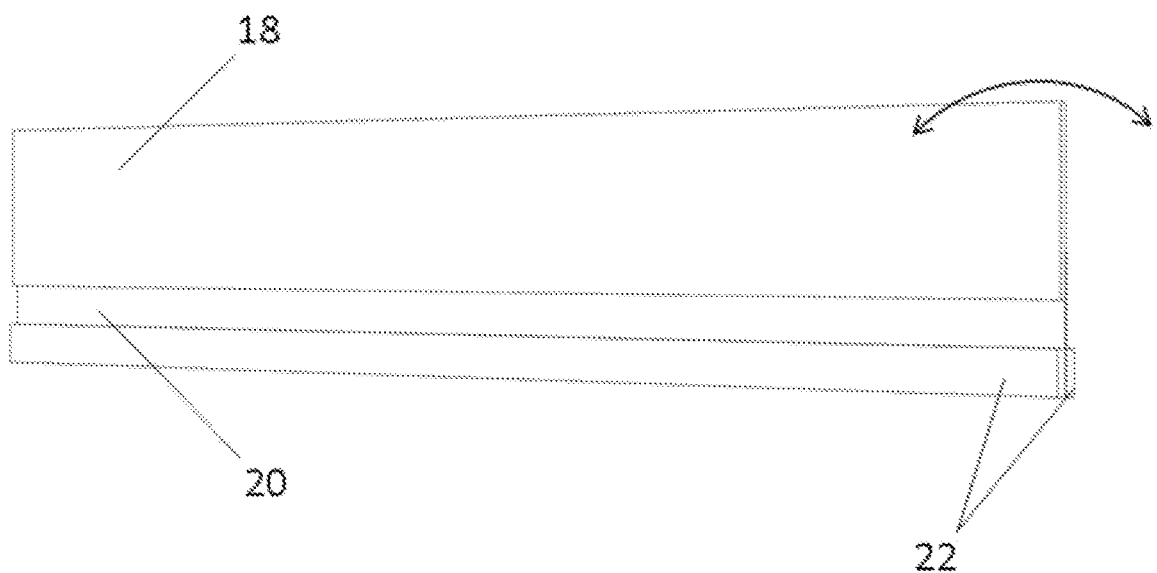
FIG. 7 is a perspective view of a fan blade assembly employing a sheet metal spring.
Figure 8:
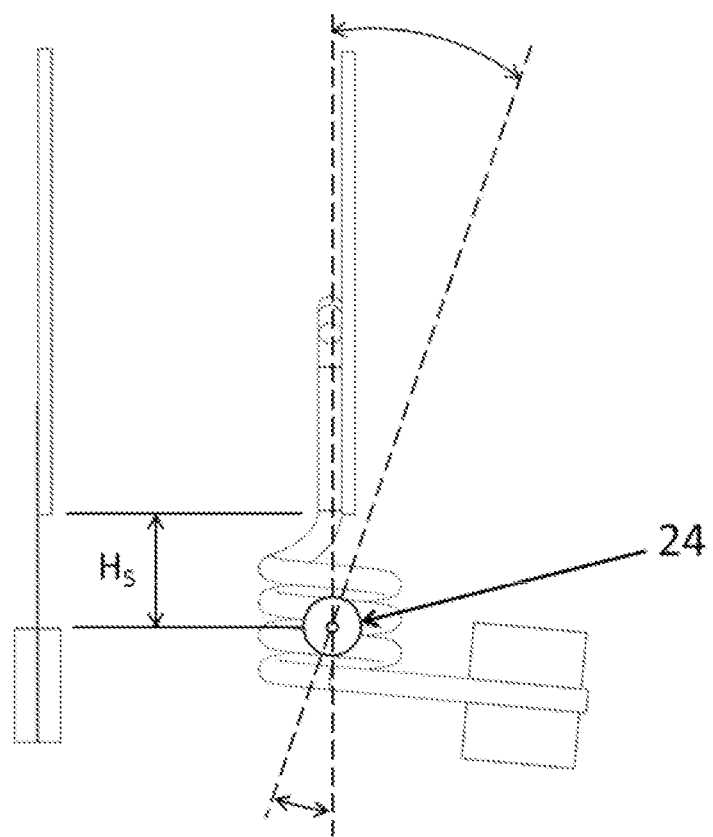
FIG. 8 is a side by side end view of the blade assemblies of FIGS. 6 and 7.

For the FEA, the blade assemblies of FIGS. 6 and 7 were designed so that their blades have equal swept volume for the same blade displacement. This equivalence requires knowing the geometrical pivot point of blade 18 in FIG. 6. FIG. 8 provides a side by side end view of the two blade assemblies of FIGS. 6 and 7 and shows that the blade pivot point for the assembly of FIG. 6 is at the center of the coil spring. As illustrated in FIG. 8, to provide swept volume equivalence, the height HS of the sheet metal spring 20 must be equal to the distance from the coil spring pivot point to the base of the blade, which is 10 mm.

For the blade assembly of FIG. 7, FEA was used to find the spring thickness resulting in a peak bending stress equal to the fatigue limit of 700 MPa for a blade tip displacement of 8 mm. For the blade assembly of FIG. 6, FEA results show that the coil springs will see a peak stress of 300 MPa at the same 8 mm displacement. FEA results for the blade assemblies of FIGS. 6 and 7 are shown in the following table.

| Model | Material | Peak Blade Displacement (mm) | Peak Bending Stress (MPa) | Resonant Frequency (Hz) | Fatigue Limit (MPa) | Saftey Factor |
|---|---|---|---|---|---|---|
| FIG. 6 (4 coil springs) | 17-7 SS | 8 | 300 | 48 | 1100 | 3.7 |
| FIG. 7 (sheet metal spring) | 717 SS Flapper Valve Steel | 8 | 700 | 46 | 700 | none |
| FIG. 6 (30 coil springs) | 17-7 SS | 8 | 300 | 131 | 1100 | 3.7 |

For a given blade assembly, air flow rates and pressures may be improved by increasing the resonant oscillating frequency, which as described above requires an increase in the spring stiffness. But for the sheet metal spring of FIG. 7, no further increases can be provided since this would increase bending stress which is already at the fatigue limit which means a stress safety factor of zero. Stress safety factor is fatigue limit divided by peak bending stress.

In comparison, the coil springs provide the following advantages of delivering a similar resonant frequency with a stress safety factor of 3.7 and by also enabling the addition of more of the same springs to the blade assembly for higher operating frequencies with no increase in stress. For example, the blade assembly could accommodate 30 of the same coil springs which would increase the resonant frequency from 48 Hz to 131 Hz, providing a 2.73× increase in air flow rate and a 7.45× increase in pressure at the same 8 mm peak displacement. Further, the large stress safety factor allows the coil springs to be designed for even higher stiffness with further gains in resonant frequencies and air performance without exceeding the fatigue limit.

Figure 9:
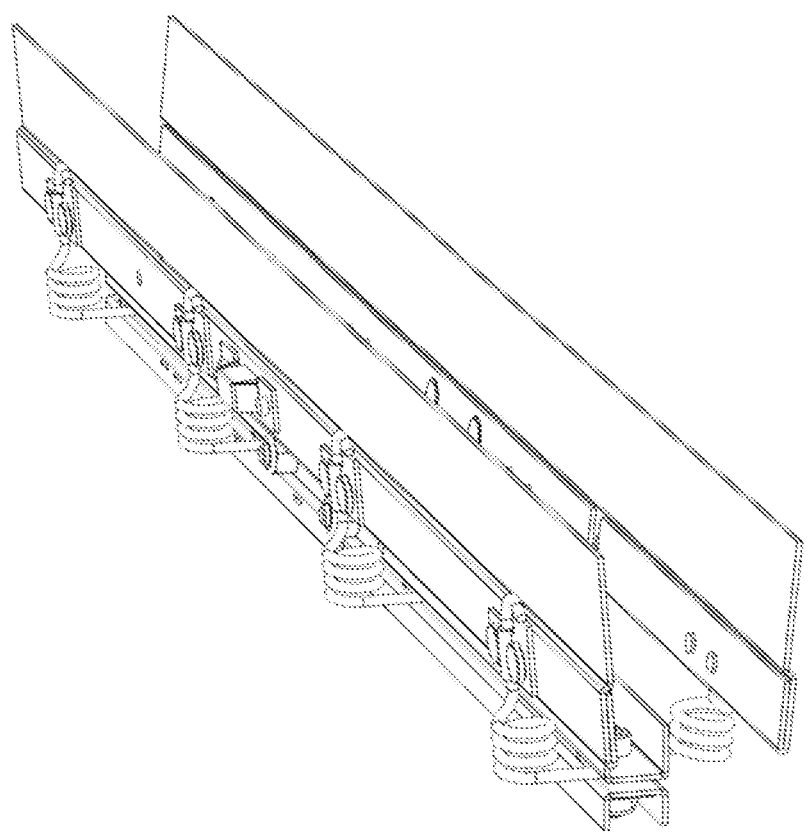
FIG. 9 is a perspective view of an exemplary embodiment of a fan blade assembly including wire springs and a plurality of fan blades.
Figure 10:
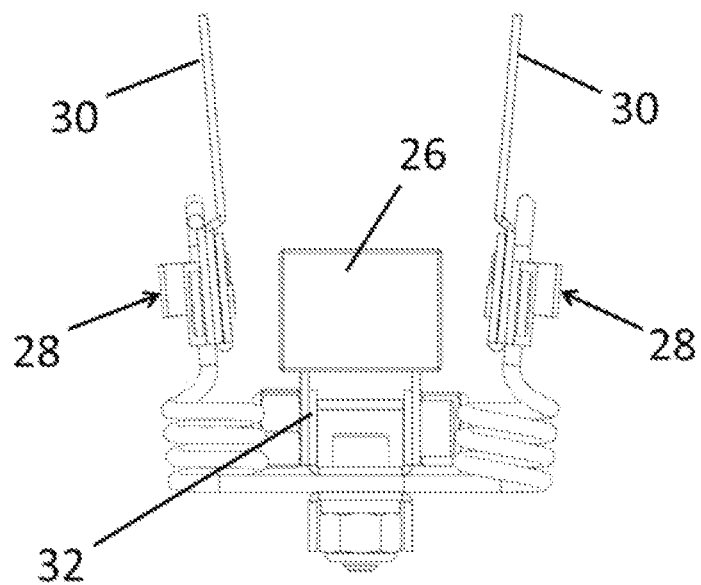
FIG. 10 is a side view of the fan blade assembly of FIG. 9.

FIG. 9, shows a two-blade linear fan developed for high power LED grow lights employing vertical coil springs with 19 in long fan blades. FIG. 10 provides an end view of the linear fan shown in FIG. 9. As shown in FIG. 10, the fan includes stator 26 rigidly connected to fan frame 32 and armatures 28 being rigidly connected to fan blades 30. In various embodiments, the electrically active component may be placed on either the frame or the blade and the electrically passive component would be correspondingly located on the other of the frame or the blade. In operation, stator 26 creates periodic magnetic fields resulting in periodic forces on armatures 28 such that blades 28 oscillate 180° out of phase so as to minimize fan vibration by promoting cancelation of the reaction forces that blades 30 exert onto the fan frame 32. Many different motor topologies can be used to actuate blades 30 with periodic forces and typical examples are provided in patent application PCT/US17/67658 High Performance Cantilever Fan the entire contents of which are hereby incorporated by reference. The fan of FIG. 9 operates at 38 Hz and delivers up to 80 CFM of air flow without exceeding the fatigue limit of the springs.

For linear fans with blades that pivot on springs, the oscillation frequency of the blade will be at or near the mass-spring resonance of the blade assembly for maximum fan energy efficiency. The resonance frequency may be tuned by adjusting the stiffness K of the coil springs with parameters such as coil diameter, wire diameter and pitch and also by adjusting the mass of the blade. Permanent magnet springs may also be added in addition to the coil springs to further increase the blade assembly's effective spring K so as to provide higher resonant frequencies and higher air flow and pressure as taught in patent application PCT/US17/67658 High Performance Cantilever Fan the entire contents of which are hereby incorporated by reference.

Figure 11:
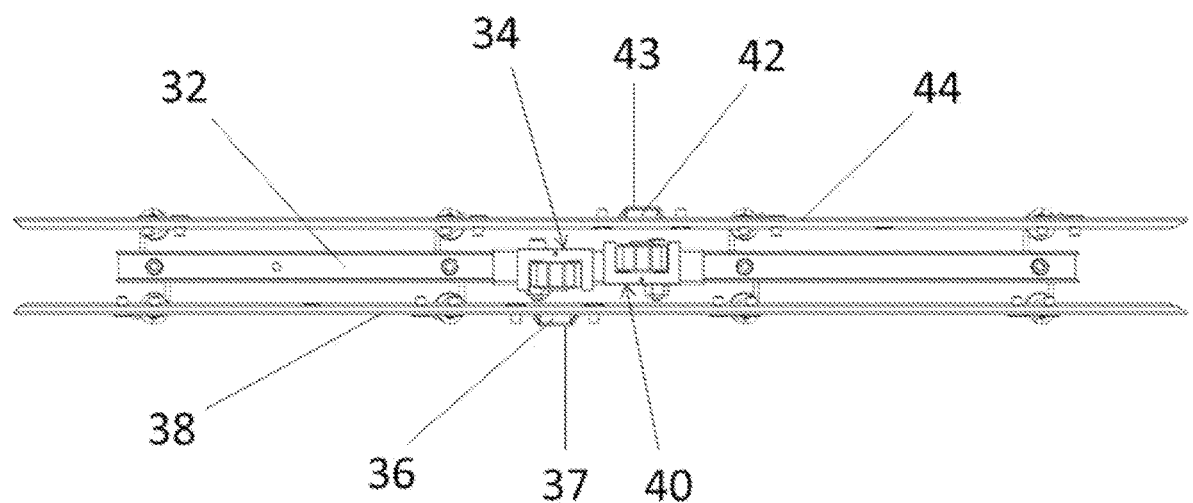
FIG. 11 is a top view of an exemplary embodiment of a linear fan including a pair of stator assemblies.
Figure 12:
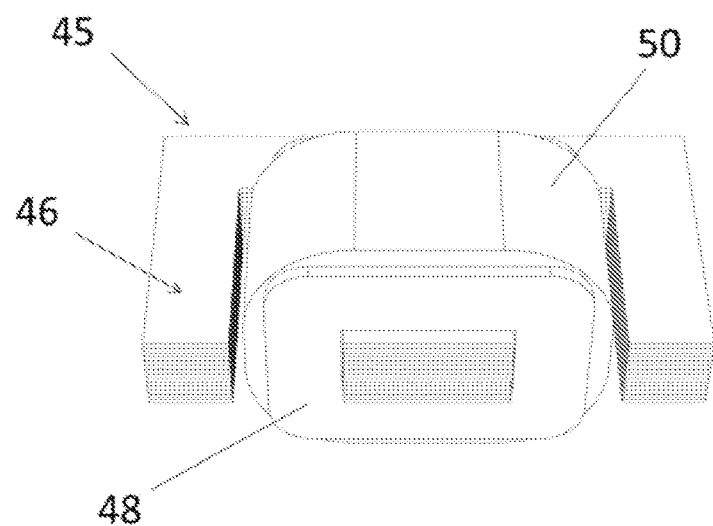
FIG. 12 is a perspective view of an exemplary embodiment a stator assembly.

FIG. 11 provides a top view of the fan of FIG. 9 and shows one motor architecture that can be used to drive the blade oscillations of the various embodiments of linear fans disclosed herein. In FIG. 11 identical stator assemblies 34 and 40 are shown positioned between blades 38 and 44 and each assembly is rigidly attached to fan frame 32. Permanent magnet 36 is rigidly attached to blade 38 and permanent magnet 42 is rigidly attached to blade 44. Stator assembly 34 exerts periodic forces on blade magnet 36 and stator assembly 40 exerts periodic forces on blade magnet 42. The components of identical stator assemblies 34 and 40 are shown in FIG. 12. Stator assembly 45 includes a lamination stack or stator core 46, a coil bobbin 48 and wire coil 50. The individual laminations of the exemplary lamination stacks or magnetic cores described herein will have a magnetic permeability greater than air and be made from materials such as silicon steel used in electric transformer laminations or any material suited for a given application. Stator cores of the current invention can be constructed of laminations or as a single component of fused powered metal or any other material or fabrication method resulting in the magnetic properties suitable for a given applications.

FIG. 13 provides a top view of stator assembly 45 of FIG. 12. The assembly includes a permanent magnet 52 that is similar to blade magnets 36 and 42 of FIG. 11. The polarization orientation of permanent magnet 52 is indicated by the circle and arrow. A current in coil 50 results in flux loops 56 and 54 which interact with the magnetic field of magnet 52 so as to create a force between stator assembly 45 and magnet 52. This force and the resulting displacement of the magnet will be in a direction parallel to the magnet's polarization direction, thereby causing magnet 52 to move either towards or away from stator assembly 45, depending on the current direction within coil 50, which is defined herein as the axial direction. Although not shown, the coil described in the various embodiments herein is connected to a voltage source that drives the current in the desired direction. A processor or controller may be provided for controlling the voltage and resulting current in the coil as well as the frequency and blade displacement. Magnet 52 in FIG. 13 will oscillate in the axial direction in response to an alternating magnetic field from stator assembly 45. In addition to the center leg 51 of the E-shaped lamination stack 46 which passes through the center of coil 50, the side legs 53 and 55 of the stack further reduce the air magnetic reluctance of flux loops 56 and 54 so as to maximize the magnetic field magnitude that interacts with magnet 52, thereby maximizing the resulting force for a given current through coil 50.

FIG. 14 shows a stator assembly 62 having an I-shaped lamination stack 57 that passes only through coil 50 and lacks the side legs 53 and 55 of FIG. 13. In comparison to lamination stack 46 of FIG. 13, lamination stack 57 of FIG. 14 results in a higher magnetic reluctance to magnet flux loops 58 and 60. As a result, the magnitude of the magnetic field that interacts with magnet 52 is reduced, thereby reducing the resulting force for a given current through coil 50. FEA magnetic modeling shows that the configuration of FIG. 13 creates twice the force as the configuration of FIG. 14, when using the same amp-turns in the coils 50, identical magnets 52 and the same lamination material in both cases. Magnet 52 in FIG. 14 will oscillate in the axial direction in response to an alternating magnetic field from stator assembly 62.

Figure 16:
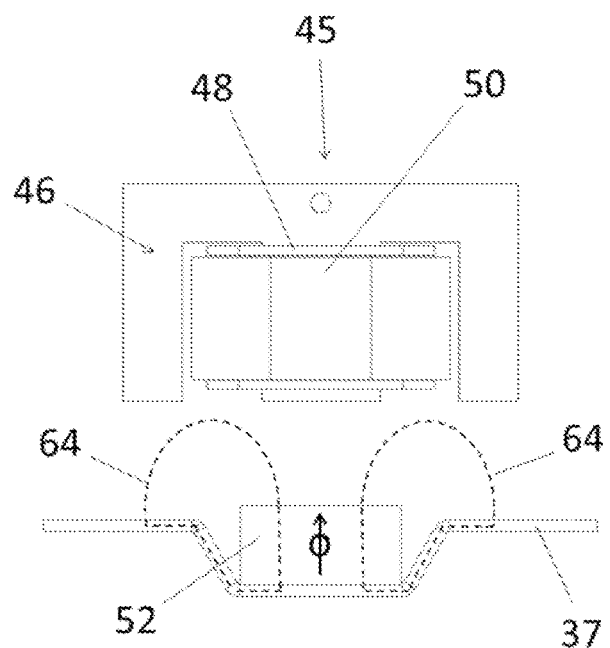
FIG. 16 is a top view of an exemplary embodiment of a motor architecture for use in a linear fan.

FIG. 15 provides a close-up view of magnet bracket 37 of FIG. 11, which serves to rigidly clamp magnet 36 to blade 38. As in FIG. 13, FIG. 16 provides a top view of stator assembly 45 and magnet 52 with the addition of magnet bracket 37. If the material of magnet bracket 37 has a magnetic permeably greater than air, then the presence of the bracket 37 will reduce the reluctance of flux loops 64 of magnet 52 so as to increase the magnitude of the magnetic field of magnet 52 that interacts with the magnetic field of stator assembly 45, thereby maximizing the resulting force between stator assembly 45 and magnet 52 for a given current through coil 50. FEA magnetic modeling shows that the addition of magnetic bracket 37 results in a 30% increase in force for the same amp-turns in coils 50, when bracket 37 has a high magnetic permeability such as with silicon steel. Magnet 52 in FIG. 16 will oscillate in the axial direction in response to an alternating magnetic field from stator assembly 45.

Figure 17:
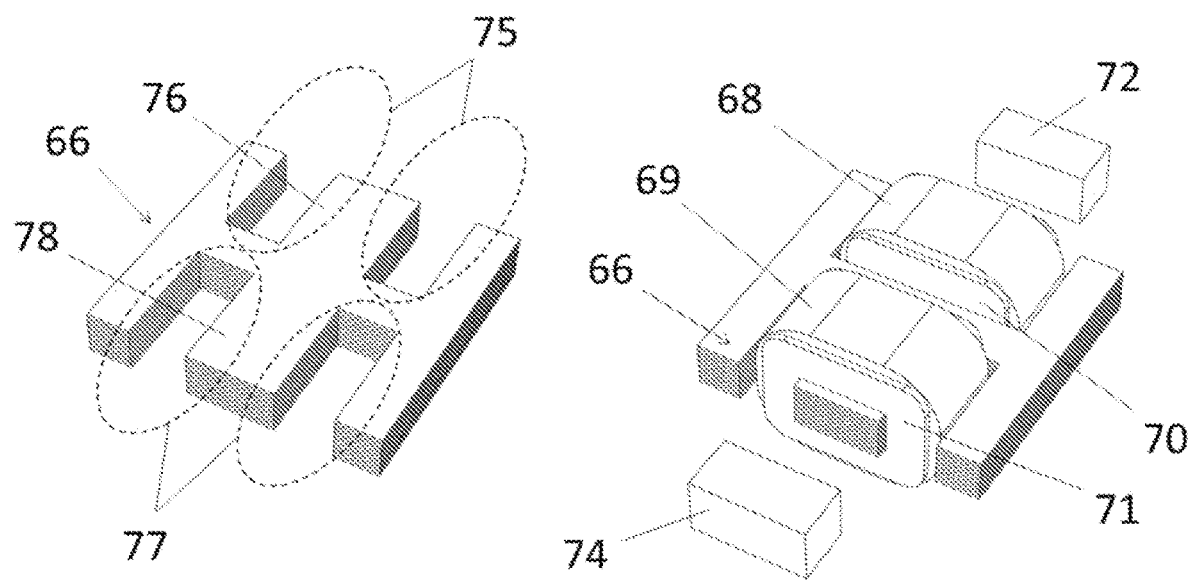
FIG. 17 includes perspective view of dual core stator assembly use in a motor for a linear fan.

FIG. 17 provides another motor architecture for delivering periodic driving forces to the fan blade magnets, where a single stator assembly is used to drive both blades instead of the two separate stator assemblies shown in FIG. 11. In FIG. 17, bobbin 71 and coil 69 are mounted on leg 78 of lamination stack 66 and bobbin 70 and coil 68 are mounted on leg 76 of lamination stack 66. Current in coil 68 generates flux loops 75 resulting in a force applied to magnet 72 and current in coil 69 generates flux loops 77 resulting in a force applied to magnet 74. The polarity of magnets 72 and 74 will be such as to cause the magnets to oscillate axially. Applying equal currents to coils 68 and 69 will result in equal forces on magnets 72 and 74 if the size of the air gaps between the magnets and the coils are equal for both magnets. When installed in a fan assembly, magnets 72 and 74 will each be attached to separate fan blades. When the same periodic current waveform is applied to coils 68 and 69, the current directions in coils 68 and 69 and the magnetic polarity orientation of magnets 72 and 74 will determine if the magnets will oscillate in phase or 180° out of phase.

Figure 18:
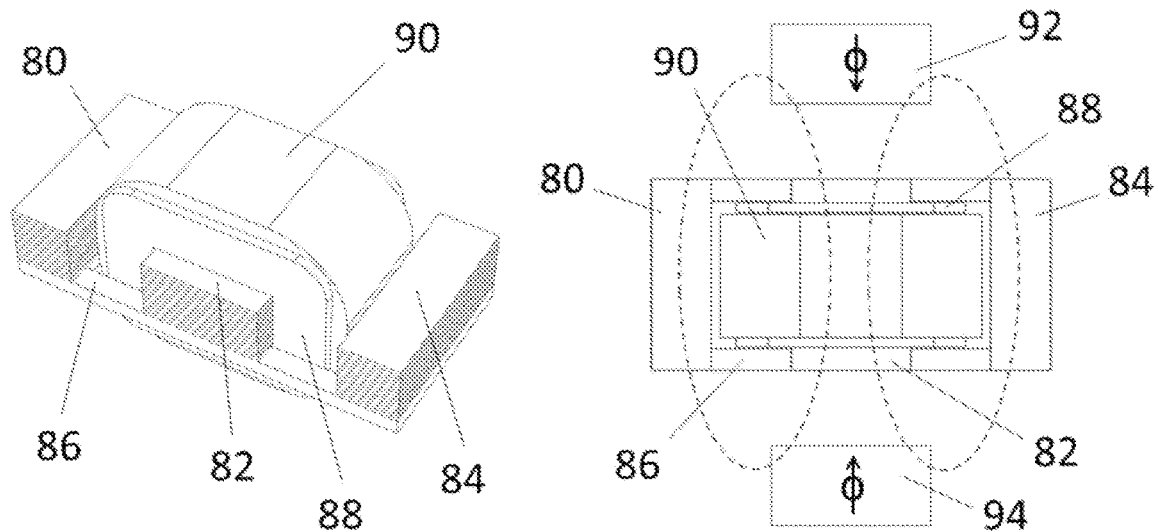
FIG. 18 includes perspective and simplified view of an exemplary embodiment of a stator assembly for use in an axial motor architecture for a linear fan.

FIG. 18 provides a further motor architecture for delivering periodic driving forces to the fan blade magnets using a single coil. The motor architecture comprises a side leg lamination stack 80, a center leg lamination stack 82 and a side leg lamination stack 84. Lamination stacks 80, 82 and 84 are all rigidly fastened together by bracket 86. A bobbin 88 and coil 90 are mounted on the center leg lamination stack 82. Appling current to the coil 90 creates the flux loops shown as dashed lines which interact with the magnetic field of magnets 92 and 94 resulting in axial forces being applied to magnets 92 and 94. Lamination stacks 80, 82 and 84 all serve to reduce the magnetic reluctance of the motor's flux loop thereby increasing the magnetic field strength which interacts with magnets 92 and 94 and maximizing the force applied to magnets 92 and 94 for a given coil current. Magnets 92 and 94 will oscillate in the axial direction in response to an alternating magnetic field from coil 90.

Figure 19:
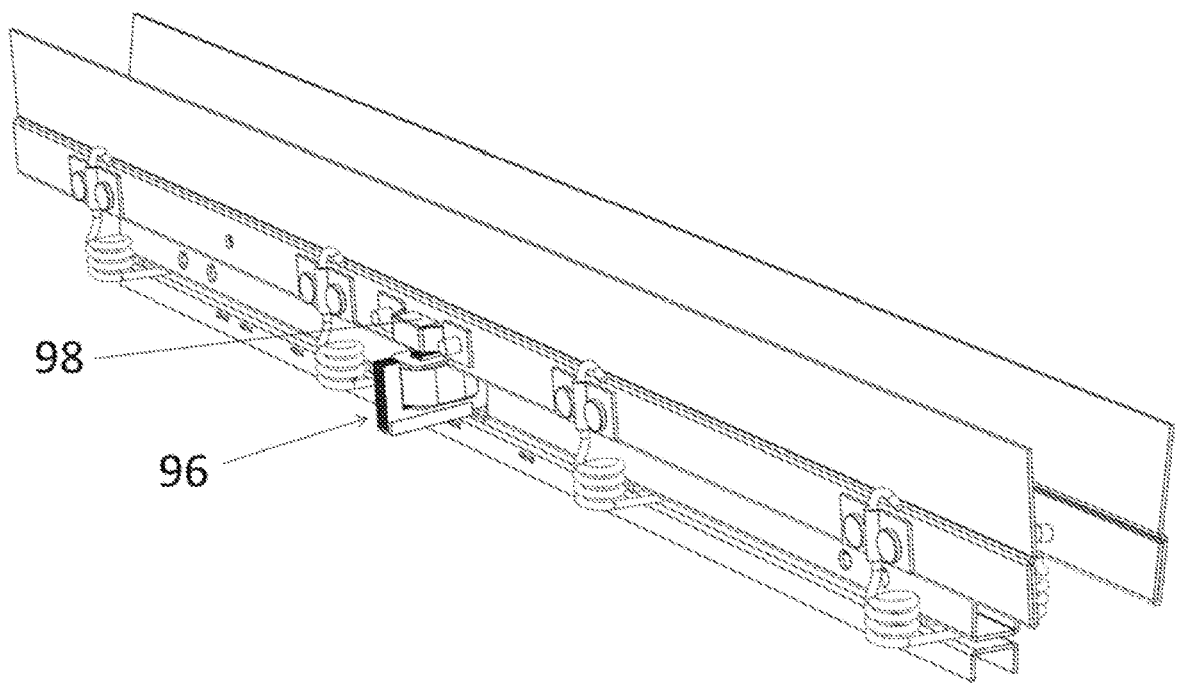
FIG. 19 is a perspective view of an exemplary embodiment of a linear fan having an axial motor architecture.
Figure 20:
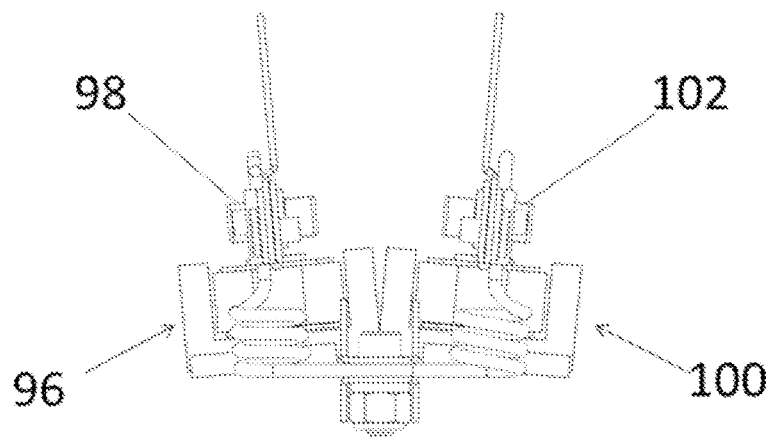
FIG. 20 is a side view of an exemplary embodiment of a linear fan having a transverse motor architecture.
Figures 21, 22:
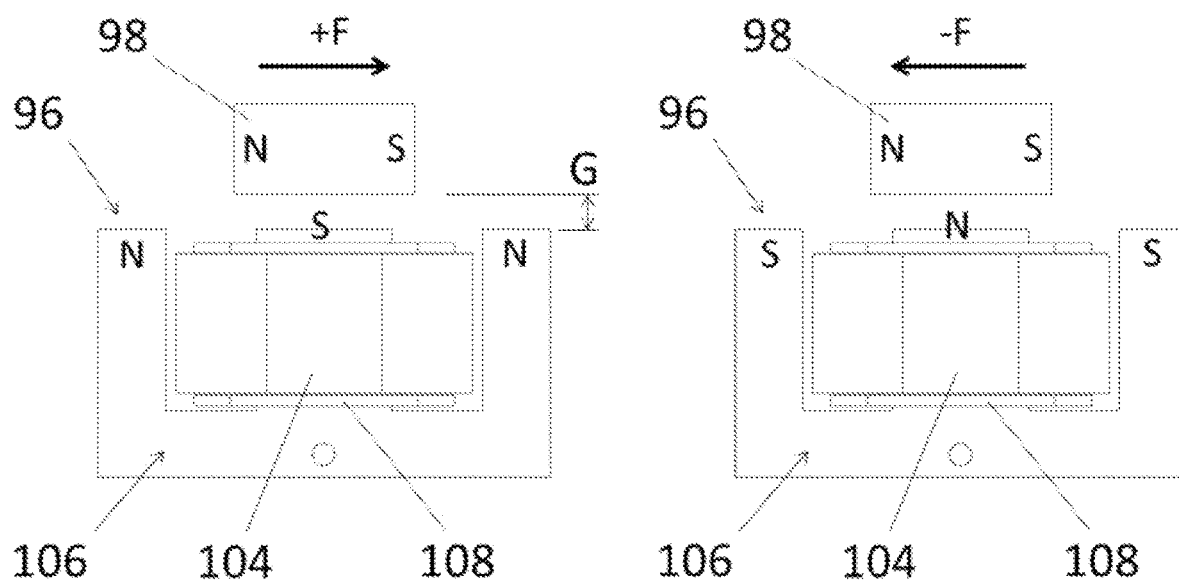
FIG. 21 is a simplified view of an exemplary embodiment of a transverse motor architecture for a linear fan.
FIG. 22 is a simplified view of an exemplary embodiment of a transverse motor architecture for a linear fan.

FIG. 19 provides a further motor architecture for delivering periodic driving forces to the fan blade magnets with a greater energy efficiency. FIGS. 19 and 20 show the orientation of identical stator assemblies 96 and 100 and their respective blade magnets 98 and 102. Further details of stator assembly 96 are shown in FIGS. 21 and 22. The stator assembly 96 includes an E-shaped lamination stack or core 106, a coil 104 and bobbin 108 mounted on the center leg of lamination stack 106 and a magnet having a magnetic polarity orientation that is rotated 90° from the axial magnet polarization direction shown in previous FIGS. 13-18. FIG. 21 shows the force vector direction resulting from a current direction in coil 104 that creates the magnetic poles shown on lamination stack 96. This force direction will cause the magnet 98 to move in the same direction as the force vector which is referred to herein as the transverse direction. The transverse direction can be seen in FIG. 21 as being transverse to the long axis of the leg of lamination stack located within the bobbin and coil. Referring to FIG. 22, reversing the current direction in coil 104 will create the magnetic poles shown on lamination stack 96 thereby exerting a force on magnet 98 in the transverse direction opposite to that of FIG. 21.

FIG. 13 identifies the air gap G between the stator assembly 45 and magnet 52. Due to the axial oscillation of the magnet and its respective fan blade, the motor architectures of FIGS. 13-18 must all have an air gap G large enough to allow the blade and magnet to oscillate without striking the stator assembly. Motor efficiency is herein defined as the force applied to the magnet divided by the electrical power consumed to create that force. Motor efficiency increases as the air gap G decreases and since G does not oscillate in the transverse motor architecture of FIG. 21, a much smaller air gap G can be provided compared to the axial motor architectures of FIGS. 13-18. Consequently, the transverse motor architecture can provide much greater energy efficiency.

Figure 23:
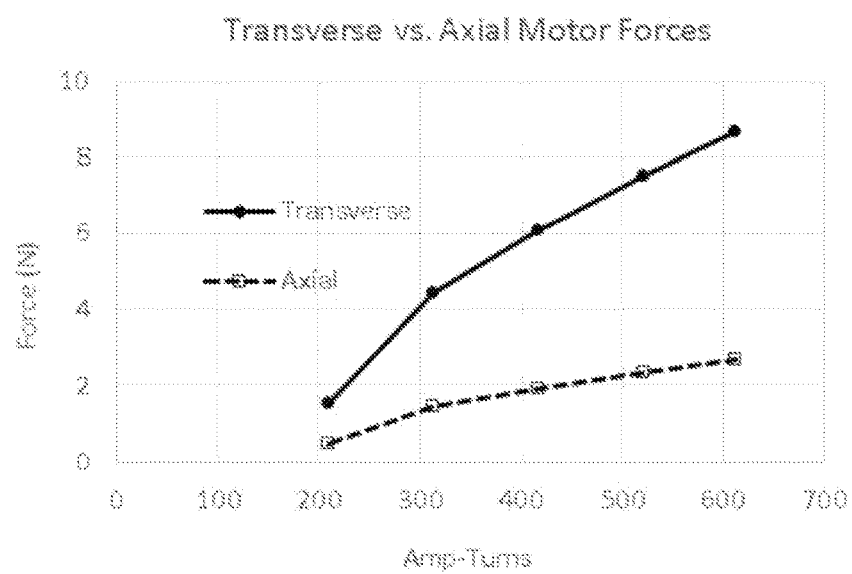
FIG. 23 is a comparative graph of force vs amp-turn data taken for exemplary embodiments of linear fans having axial and transverse motor architectures.

Measurements were conducted to compare the axial and transverse stator-magnet assemblies shown in FIGS. 13 and 21. For these measurements, the stator assemblies were identical for both the axial and transverse architectures and only the magnet polarity was changed. The stator assemblies were constructed from EE-26-27 transformer laminations and a 230-turn coil. The magnets were neodymium-iron-boron having dimensions of 0.25 in×0.25 in×0.5 in. The fan embodiments disclosed herein will have their highest electro-mechanical energy efficiency when operating at their mass-spring resonance frequency. At this resonance frequency, the peak motor force will occur at the blade's maximum velocity which occurs at the point mid-way between the blade's two extreme displacement positions. At this point in the blade's stroke, the magnets are centered in front of their respective stator assemblies and so the static force measurements were conducted with the magnets in their center positions, as shown in FIGS. 13 and 21. The force vs amp-turn data taken for both the axial and transverse motor architectures is provided in the plot of FIG. 23 which shows that the efficiency of the transverse motor architecture is approximately 3 times greater than the axial motor architecture.

The motor architecture of FIG. 21 may be located along any edge of the blade and is not limited to the position shown in FIG. 19. However, different locations are more or less desirable with respect to their interference or obstruction of the fan's air flow.

Figure 24:
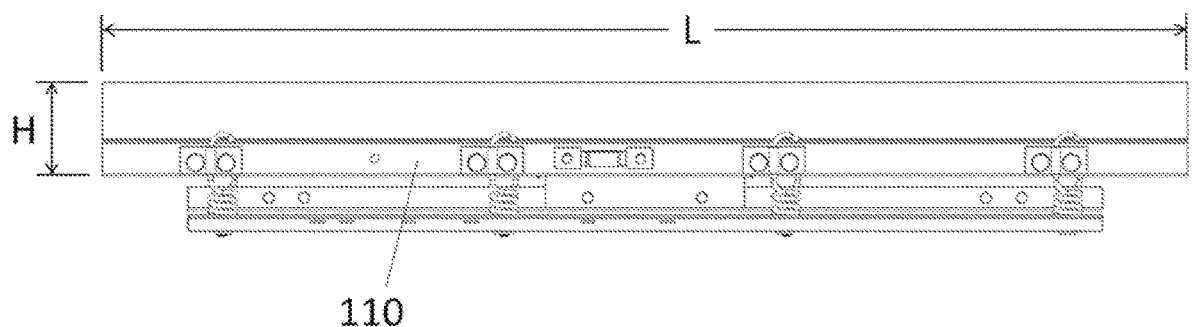
FIG. 24 is a side view of an exemplary embodiment of a linear fan blade assembly.

The present invention enables unique and flexible fan form factors that can provide significant thermal performance and end-product design advantages when using forced-air thermal management systems or for any other fan application. For example, a side view of the fan of FIG. 9 is shown in FIG. 24 to illustrate the large blade length L to width W ratios that are possible. The length L of blade 110 is 484 mm and the height H is 41 mm, giving a L/H ratio of 11.8. These blade lengths illustrate how the fan can be stretched to a long form factor so that one fan can provide direct air flow to a large heat sink, or other large area, that would otherwise require multiple rotary fans. The disclosed embodiments represent the first disclosure and use of linear fan having a fan blade with a L/H ratio greater than 1.0. Much higher L/H ratios can be achieved as required by different application requirements.

Figure 25:
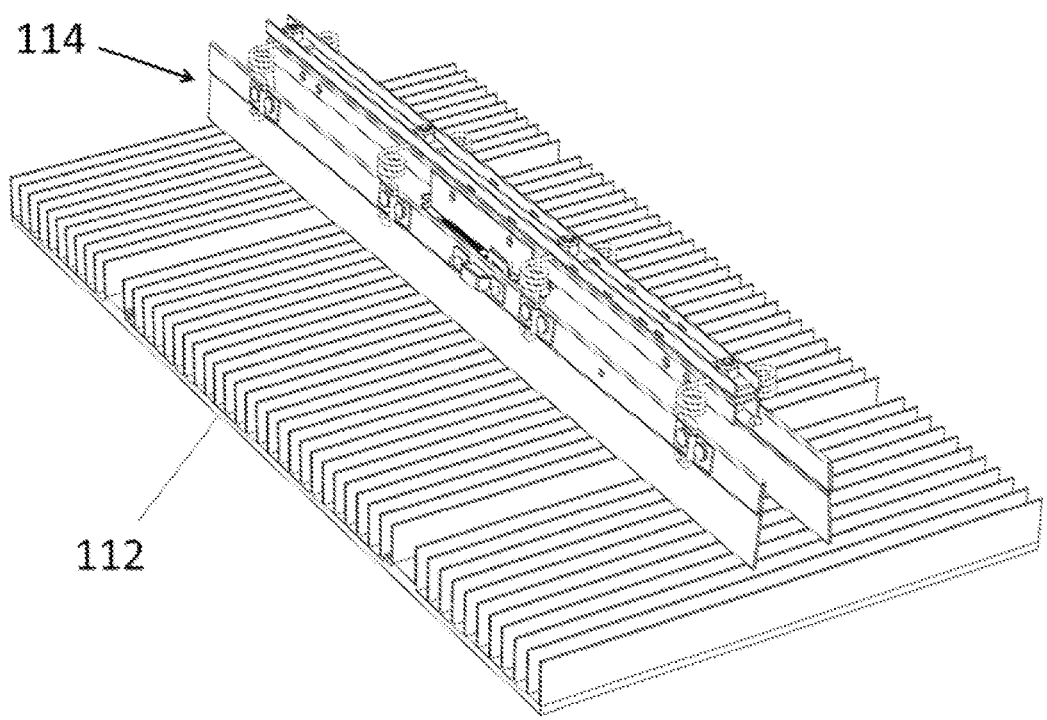
FIG. 25 is a perspective view of an exemplary embodiment of linear fan and heat sink assembly.

One example of the aforementioned application advantages is presented in FIG. 25, which shows a heat sink 112 having a plurality of fins forming channels for air flow. FIG. 25 shows an impingement forced-air thermal solution, where a single linear fan 114 can provide impingement air flow across all the heat sink fin channels of the 19-inch-long heat sink 112. The length of the heat sink 112 and the fan can be adjusted to match cooling requirements associated with a device being cooled. An end view of the FIG. 25 fan-sink configuration is provided in FIG. 26 which shows how the fan's impinging air flow is directed down toward the heat sink where the air flow is divided with half of the air flow exiting the left side of the heat sink fin channels and half of the flow exiting the right side of the heat sink fin channels.

The ability to extend the length of a fan to match a given heat sink size enables the heat transfer advantages of impingement air cooling to be realized on very large heat sinks with only one fan. These impingement air flow advantages include the improved heat transfer coefficients associated with counter-flow heat transfer, reduced pressure drops through the heat sink because the heat sink channels are only exposed to ½ of the fan's total flow rate and lower thermal resistances due to the air flow traveling through only ½ the length of the channels resulting in lower increase in air temperature and smaller average heat sink-to-ambient ΔT values, when compared to an end-to-end channel forced air flow path.

Figure 26:
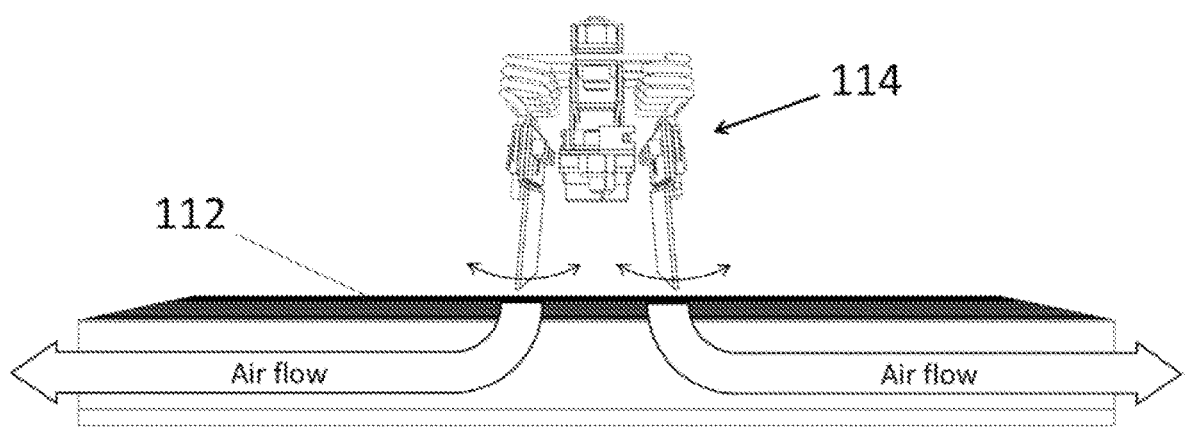
FIG. 26 is a side view of embodiment of linear fan and heat sink assembly of FIG. 25 showing the direction of air flow.
Figure 27:
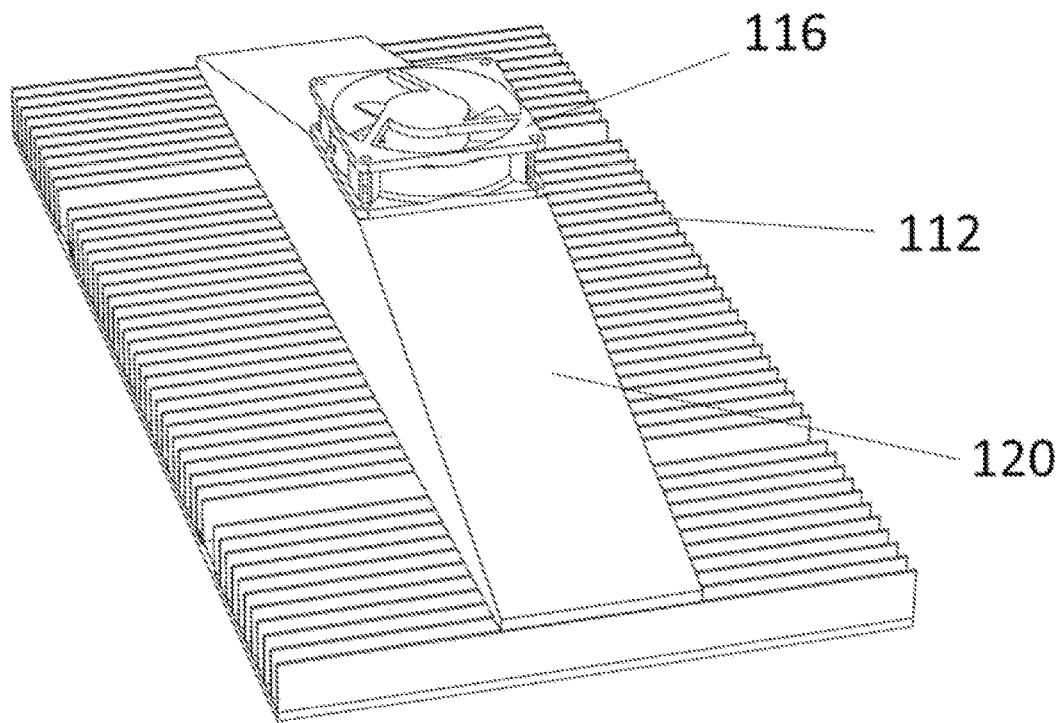
FIG. 27 is a perspective view of a rotary fan and heat sink assembly.

FIG. 27 further illustrates the advantages of the disclosed innovative linear fan and its stretchable form factor when compared to rotary fans. In order to use a single rotary fan 116 to provide similar impingement cooling to heat sink 112 of FIGS. 25 and 26, a duct 120 would be required to direct the air flow to the central area of the heat sink. Due to the cross-sectional flow area expansion from fan 116 to the exit of baffle 120, the rotary fan's exit velocity must be higher than the target air velocity in the heat sink fin channels. In the example demonstrated in FIG. 27, the fan exit velocity would have to be eight times higher than the target air velocity in the heat sink fin channels. In contrast, the linear fan and its stretched fan form factor shown in shown FIGS. 25 and 26 enable the fan blades to provide air directly to all of the fin channels without the velocity reduction caused by the intermediate baffle 120 of FIG. 27. Consequently, the exit velocity of the stretch linear fan is essentially equal to the air velocity in the heat sink fin channels. Consequently, the linear fan of FIG. 25 is only required to deliver ⅛ of the fan exit velocity of the rotary fan shown in FIG. 27, in order to provide the same total heat sink air flow rate. The lower t velocity of the air exiting the linear fan results in significantly lower air flow noise. Also, the use of the linear fan eliminates the noise associated with the rotary fan bearing which is significant at the higher RPM required to deliver fan exit velocities that are eight times higher than the target heat sink fin channel velocity.

Figure 28:
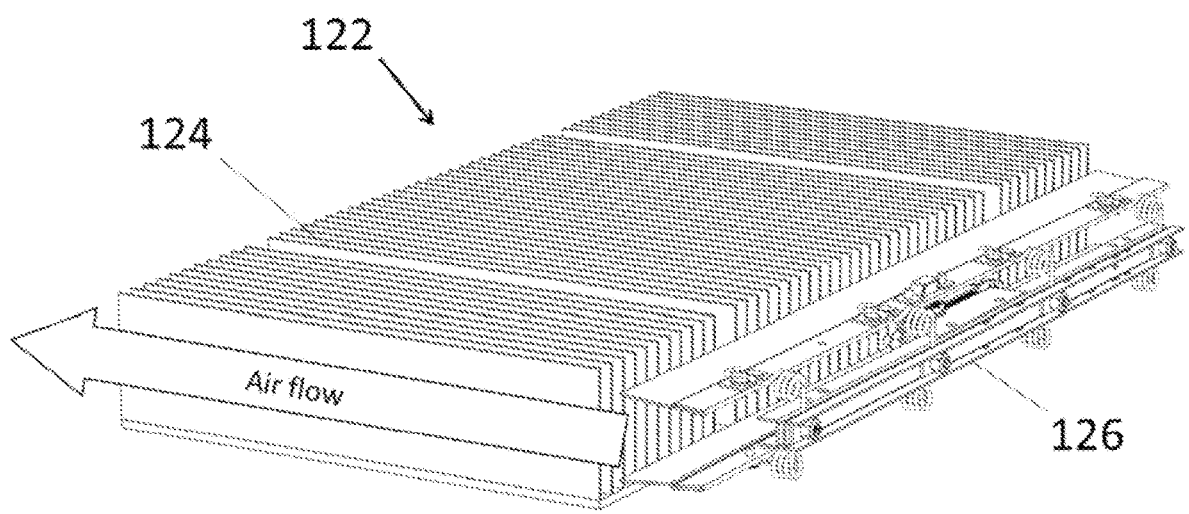
FIG. 28 is a perspective view of an exemplary embodiment of linear fan and heat sink assembly.

In addition to the impingement fan-sink arrangement shown in FIGS. 25 and 26, the stretch linear fan architecture can be used in any number of fan-sink configurations. For example, FIG. 28 shows a fan-sink 122 having a stretch fan 126 located at the entrance to the fin channels of heat sink 124 which provides air flow along the entire length of the fin channels of heat sink 124.

Prior to the development of the innovative linear fan system disclosed in this application, there were significant unsolved technical challenges to designing a successful stretch linear fan architecture and so the advantages of the stretch architecture remained commercially unavailable. The requirements for commercial viability and the resulting technical challenges are explained as follows.

Figure 29:
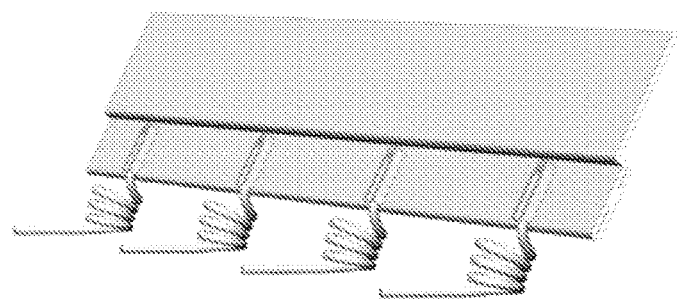
FIGS. 29-32 show the movement of a linear fan blade at different modes of excitation.

Requirement 1: Operation at Resonance—The blades of any linear fan must run at or near the frequency of their fundamental mass-spring resonant mode in order to provide commercially acceptable energy efficiency and air performance. When operating at this fundamental mode frequency, the blade pivots on its springs allowing the tip of the blade to oscillate as illustrated by the curved arrow-line in FIG. 2 and further illustrated by the blade's fundamental mode deflection shown in FIG. 29, herein referred to as the fundamental mode.

Requirement 2: Resonance quality factor Q—When operating in the fundamental mode, the mass-spring oscillator must also have a high resonance quality factor Q in order to provide commercially acceptable energy efficiency. Q can be expressed as the mechanical resonator's total stored energy divided by the energy dissipated per cycle.

Requirement 3: Dynamic Stability—The fan blades must provide stable oscillation in the fundamental mode without the excitation of any of the blade's higher order mechanical resonant modes. In the absence of higher order mode oscillations, the motion of the blade in the pure fundamental mode is like a door pivoting on its hinge.

Figure 30:
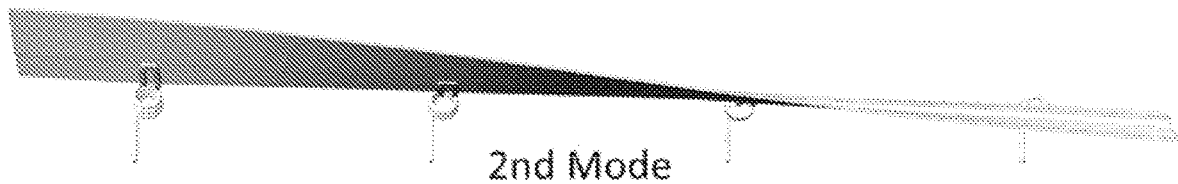
Figure 31:
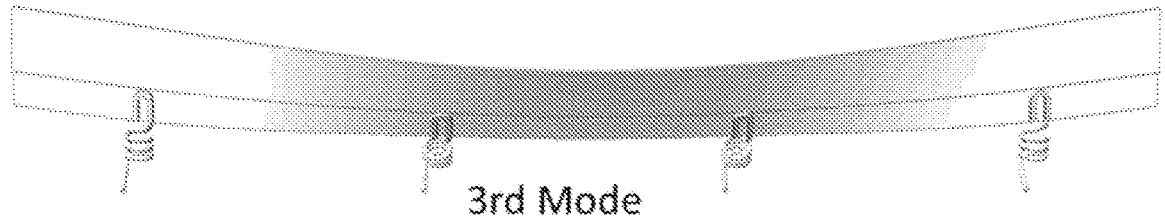
Figure 32:
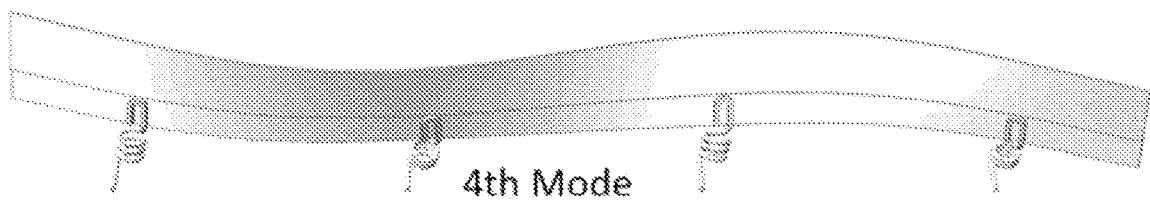

Requirement 3 is essential to satisfying requirements 1 and 2. But dynamic stability can be difficult to achieve due to the rich modal spectrum of practical linear fan blades. As illustrated by blade modes 2-4 in FIGS. 30-32, the excitation of the blade at higher modes will cause different sections of the blade to move in different directions and at different frequencies and phases. The presence of higher modes will also rob stored energy from the fundamental mode thereby reducing the Q of the fundamental mode which will reduce the blade's oscillating displacement and air flow. Excitation of higher modes will also cause a rapid and chaotic shifting of the fundamental mode's resonant frequency making it impossible to hold the fan reliably on the fundamental resonance frequency. These higher modes will also create unpredictable mechanical stresses leading to failure as well as unacceptable noise and vibration of the fan. In summary, the fan will be inoperable and/or unreliable unless the excitation of higher blade modes can be avoided.

Figure 33:
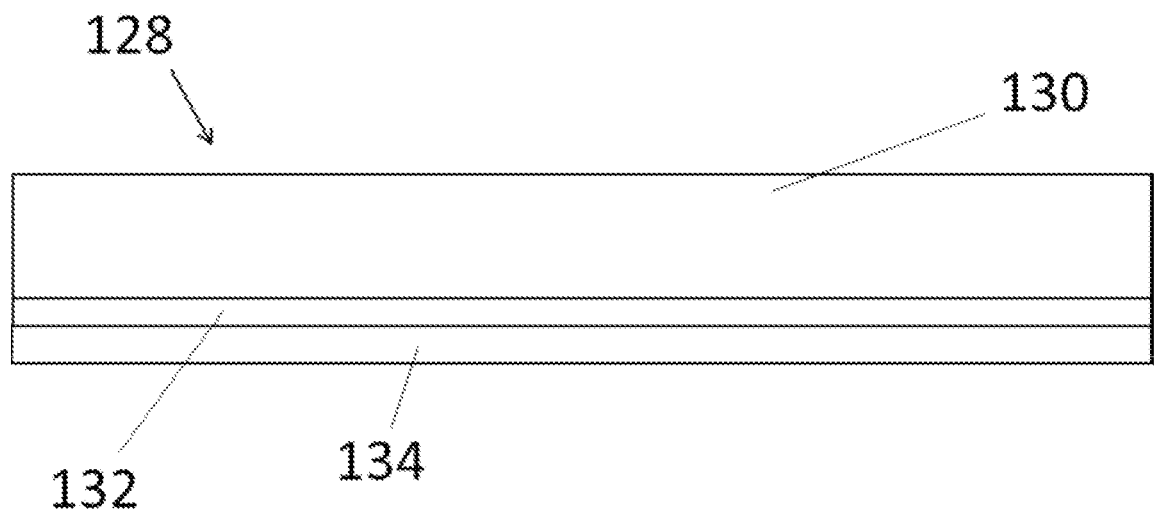
FIG. 33 is a perspective view of a linear fan system employing a sheet metal blade spring.

Prior to the development of the innovative linear fan system disclosed in this application, linear fans used sheet metal blade springs as shown in blade assembly 128 of FIG. 33, where a blade 130 pivots on a sheet metal spring 132, with the lower end of sheet metal spring 132 being rigidly connected to stationary spring clamp 134. Blade assemblies using sheet metal springs have been unable to satisfy the above requirements for the following reasons.

Figure 34:
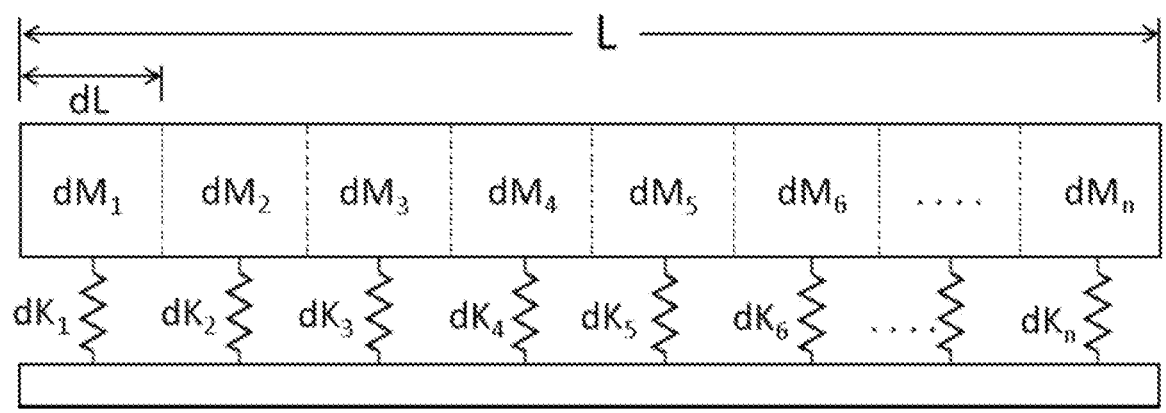
FIG. 34 is a side view of a representation of the blade assembly of FIG. 33 as a differential mass-spring network.

FIG. 34 illustrates how blade assembly 128 of FIG. 33 can be represented as a differential mass-spring network due to its multiple degrees of freedom. Along its length L, a blade of total mass M and total spring stiffness K can be functionally divided up into differential length segments dL with each length segment having its respective mass dMn, spring stiffness dKn and resonant frequency fn. The differential oscillators are coupled by the blade which can be thought of as a spring, since the blade is not infinitely stiff. Assuming all of the differential masses dMn are equal, all of the dKn values are equal, then all the fn and Qn values will also be equal. In this case, Qn=Qe where Qe is the effective resonance quality factor of the blade assembly 128 operating in the fundamental mode. Due to the degrees of freedom of blade assembly 128, these equalities, or near equalities, are required for the blade to oscillate stably in the fundamental mode. Conversely, if the dMn and dKn values are not equal, then different sections of the blade will respond with different phases with respect to the drive frequency causing the oscillation of those sections to either lead or lag the fundamental mode oscillation of the blade. As can be seen from the higher modal shapes in FIGS. 30-32, this sectional leading and lagging behavior is ideal for exciting the blade's higher resonant modes with all of the negative performance consequences described above.

If the Kn values vary along L, then the superposition of all the fn values and associated Qn curves will significantly reduce Qe of blade assembly 128 resulting in proportional increases in fan power consumption in addition to the dynamic instabilities.

Figure 1:
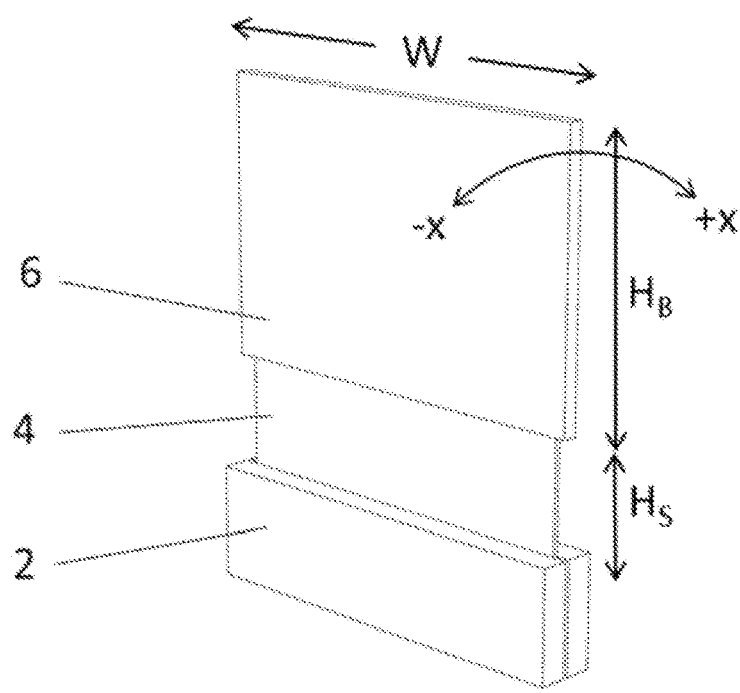
FIG. 1 is a perspective view of fan blade assembly employing a sheet metal spring.

The coefficient of thermal expansion issue described in association with FIG. 1 will cause sheet metal spring 132 of FIG. 33 to distort, thereby inducing significant variations in the Kn values resulting in the excitation of higher modes as described above. The various embodiments of the linear fan system described herein eliminate the coefficient of thermal expansion issue by using discrete coil springs. Further, using a small number of discrete springs with very well-defined attachment points, rather than the distributed attachment of a sheet metal spring, creates large dL values and enables the design and manufacturing control over dL and Kn to achieve dynamic stability with complete immunity to thermal expansion effects. The Q values of each section dL can be easily and precisely matched resulting in the highest achievable Qe value for the blade assembly. Qe values of 100 and higher can be easily achieved for blade assemblies of the present invention like those shown in FIGS. 2 and 9.

In summary, the use of the blade springs described herein provide very stable operation of long blades in the fundamental mode, thereby enabling the unique stretched fan architecture. There is no practical limit to the length of these fan blades designed according to the present invention, while still providing stable operation in the fundamental mode. However, the designer will find that in some cases as blade length increases, additional motors will be needed in order to apply driving forces to the blade at multiple points along the blade's length so as not to introduce unacceptable blade distortions.

The linear fans described in this application can be used in any number of forced-air cooling applications, where the electronic components that are thermally bonded to the base of the heat sinks, like those shown for example in FIGS. 25 and 28, could include for example LEDs for general purpose lighting, LEDs for grow lights, a photo voltaic panel for solar power especially where solar concentrators are used and any general purpose PCB requiring forced-air cooling. Other applications for the linear fan described in this application include air cooling in hot harsh environments such as automotive liquid-to-air heat exchangers, liquid or air-cooling of automotive batteries, forced-air cooling in outdoor applications such as battery and electronics enclosures used in traffic control, energy, security, telecom, etc.

Figure 35:
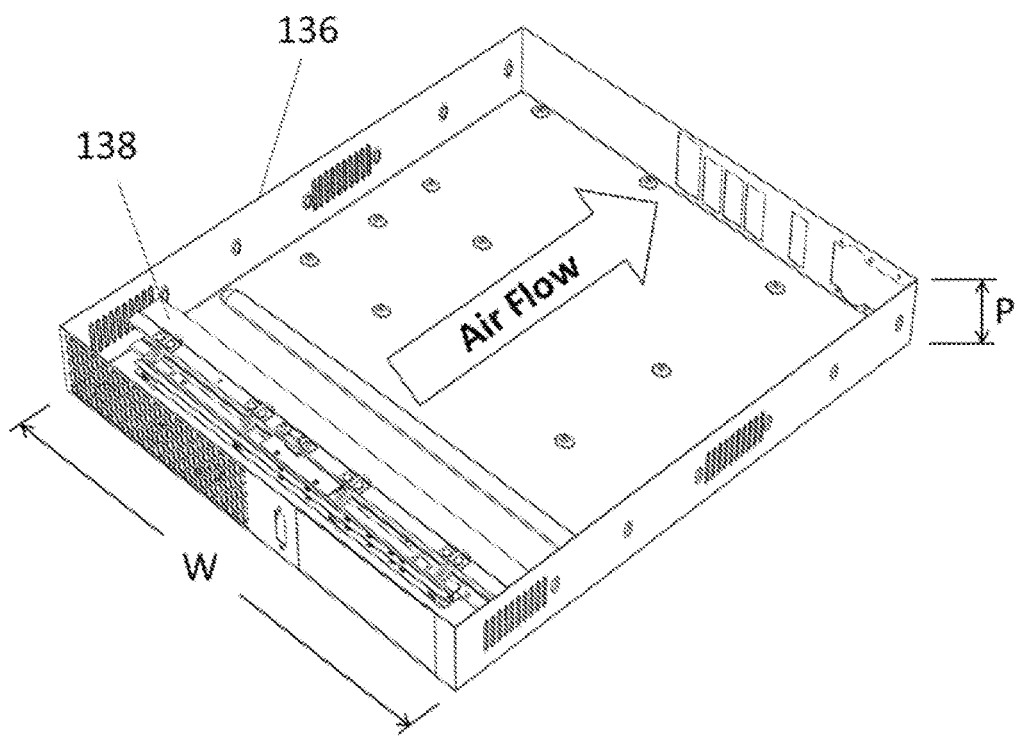
FIG. 35 is a perspective view of the air flow created in a housing by an exemplary embodiment of a linear fan.
Figure 36:
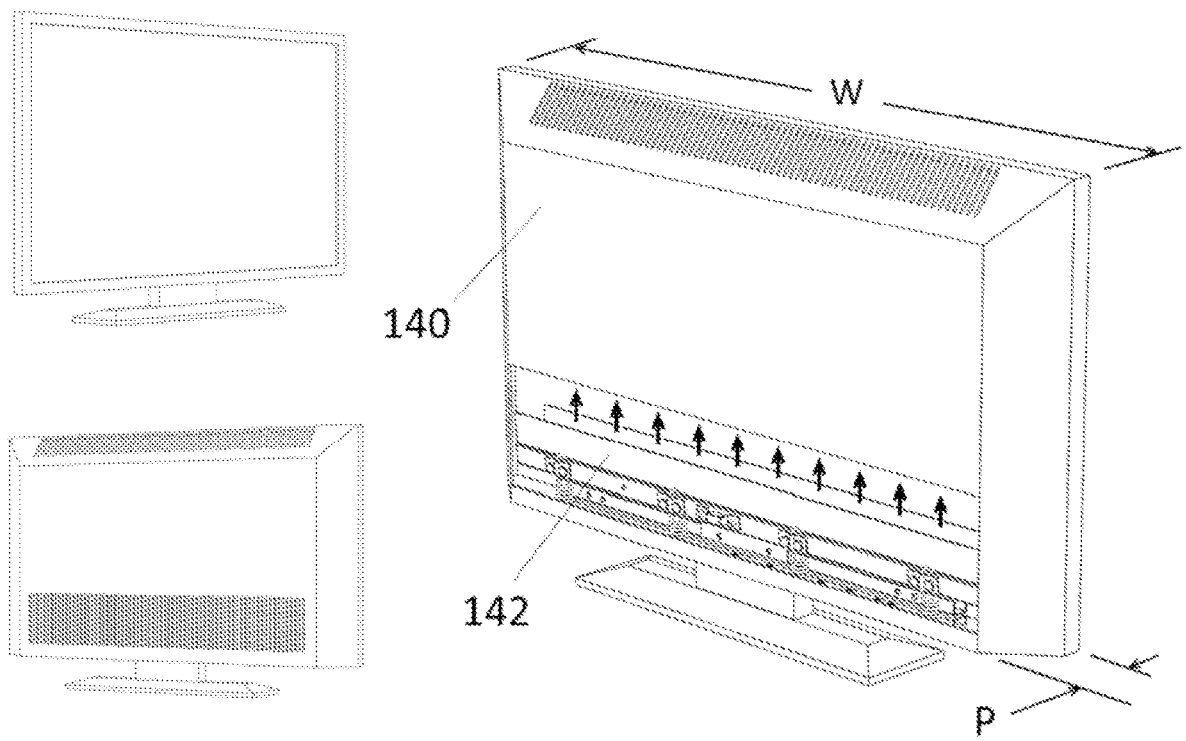
FIG. 36 shows an exemplary embodiment of a linear fan employed to cool a TV or computer monitor.

The stretch fan architecture described in this application also lends itself to products where thermal management requires air flow through low-profile architectures such as for example, blade servers, thin video screens used for computers monitors, consumer TVs and video walls. FIG. 35 illustrates how a single linear fan 138 can provide the air flow, indicated by the arrow, across the width W and through the low-profile dimension P, of a blade server 136. FIG. 36 illustrates how a single linear fan 142 can provide the air flow, indicated by the arrows, across the width W and through the low-profile dimension P, of a thin screen TV or computer monitor.

What is claimed is:

1. A linear fan comprising:
   a fan blade connected to a fan frame;
   the fan blade having a free end and a connected end such that the blade can oscillate by pivoting along the connected end;
   a motor including a permanent magnet connected to the fan blade and a stator assembly including a current carrying coil wrapped around a leg of a lamination stack; wherein the motor is controlled to vary the direction of the current being carried in the coil to thereby change the direction of the magnetic field created by the stator assembly and cause the fan blade to oscillate;
   wherein the stator assembly is mounted to the fan frame.

2. The linear fan of claim 1, wherein the lamination stack includes two additional legs which participate in the stator's flux loop, wherein the legs are located on opposite sides of the coil.

3. The linear fan of claim 1, wherein the permanent magnet is mounted to the fan blade by a bracket that extends along the sides of the permanent magnet to thereby reduce the reluctance of the magnetic flux loops created by the permanent magnet.

4. The linear fan of claim 1, wherein the leg of the lamination stack is separated from the permanent magnetic by a distance that remains substantially the same when the fan blade oscillates.

5. The linear fan of claim 1, wherein the stator assembly is positioned at the connected end of the fan blade so that the fan blade oscillates in a direction transverse to the axis of the leg of the lamination stack.

6. The linear fan of claim 1, wherein the fan blade is connected to the fan frame by a wire spring.

7. The linear fan of claim 1, further comprising a second fan blade connected to the fan frame, and wherein the first and second blade assemblies oscillate 180 degrees out of phase so as to promote cancelation of reaction forces exerted by each of the blade assemblies on the fan frame.

8. The linear fan of claim 1, wherein the stator assembly is positioned on a side of the fan blade so that the distance between the permanent magnet and the stator assembly varies as the fan blade oscillates in a direction parallel to the axis of the leg of the lamination stack.

9. A linear fan comprising:
a fan blade attached a fan frame by a wire spring having a first end attached to the fan blade and a second end attached to the fan frame;
wherein the fan blade includes a free end such that the blade oscillates by pivoting on the wire spring;
wherein the wire spring flexes to enable the fan blade to oscillate;
a motor for driving the oscillation of the fan blade, wherein the motor includes a permanent magnet connected to the fan blade and a stator assembly connected to the fan frame;
a stator assembly including a current carrying coil wrapped around a leg of a stator core; wherein the motor is controlled to vary the direction of the current being carried in the coil to thereby change the direction of the magnetic field created by the stator assembly and cause the fan blade to oscillate.

10. The linear fan of claim 9, further comprising a second fan blade attached to the fan frame, and wherein the first and second blade assemblies oscillate 180 degrees out of phase so as to promote cancelation of reaction forces exerted by each of the blade assemblies on the fan frame.

11. The linear fan of claim 9, wherein the stator assembly is positioned at the attached end of the fan blade so that the fan blade oscillates in a direction transverse to the axis of the leg of the stator core.

12. A linear fan and heat sink assembly comprising:
a linear fan comprising:
  a fan blade connected to a fan frame;
  the fan blade having a free end and a connected end such that the blade can oscillate by pivoting along the connected end;
  a motor including a permanent magnet connected to the fan blade and a stator assembly including a current carrying coil wrapped around a leg of a lamination stack; wherein the motor is controlled to vary the direction of the current being carried in the coil to thereby change the direction of the magnetic field created by the stator assembly and cause the fan blade to oscillate;
  wherein the stator assembly is mounted to the fan frame; and
a heat sink comprising a plurality of channels formed by parallel fins;
wherein the linear fan operates to force air through each of the channels when the fan blade oscillates and wherein the ratio of the length of the fan blade to the height of the fan blade is greater than 1.0.

13. The assembly of claim 12, wherein the fan blade extends in a direction perpendicular to the rows of parallel fins and wherein the length of the fan blade extends substantially the entire width of the heat sink so that the velocity of the air leaving the fan is substantially the same as the velocity of the air through each of channels when the fan blade oscillates.

14. The assembly of claim 12, wherein the linear fan is located approximately at the middle of the heat sink in order to force air through the heat sink in two opposite directions.

15. The assembly of claim 13, wherein the linear fan includes a second fan blade attached to the fan frame, and wherein the first and second blade assemblies oscillate 180 degrees out of phase so as to promote cancelation of reaction forces exerted by each of the blade assemblies on the fan frame.

16. The assembly of claim 12, wherein the linear fan is located at a side of the heat sink so that air is forced through the channels in one direction when the fan blade oscillates.

17. The assembly of claim 15, wherein the linear fan includes a second fan blade connected to the fan frame, and wherein the first and second blade assemblies oscillate 180 degrees out of phase so as to promote cancelation of reaction forces exerted by each of the blade assemblies on the fan frame.

18. The assembly of claim 12, wherein the fan blade is connected to the fan frame by a wire spring.

* * * * *